May 4, 1954     H. P. COLLIER, JR     2,677,634
METHOD OF MAKING SPECTACLE FRAMES
Filed Oct. 6, 1953
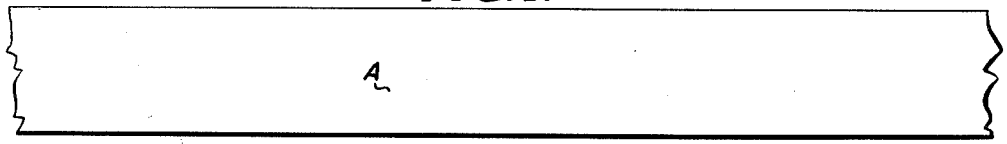
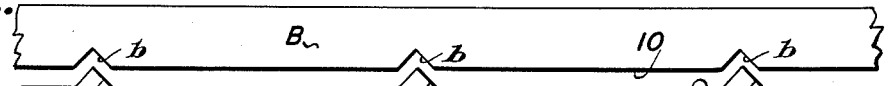
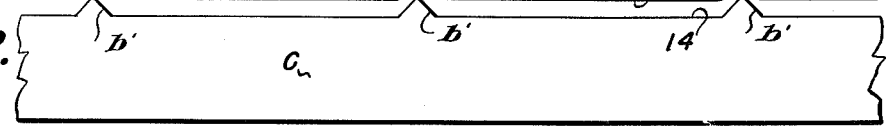
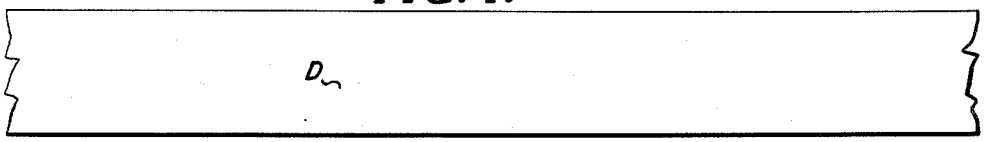
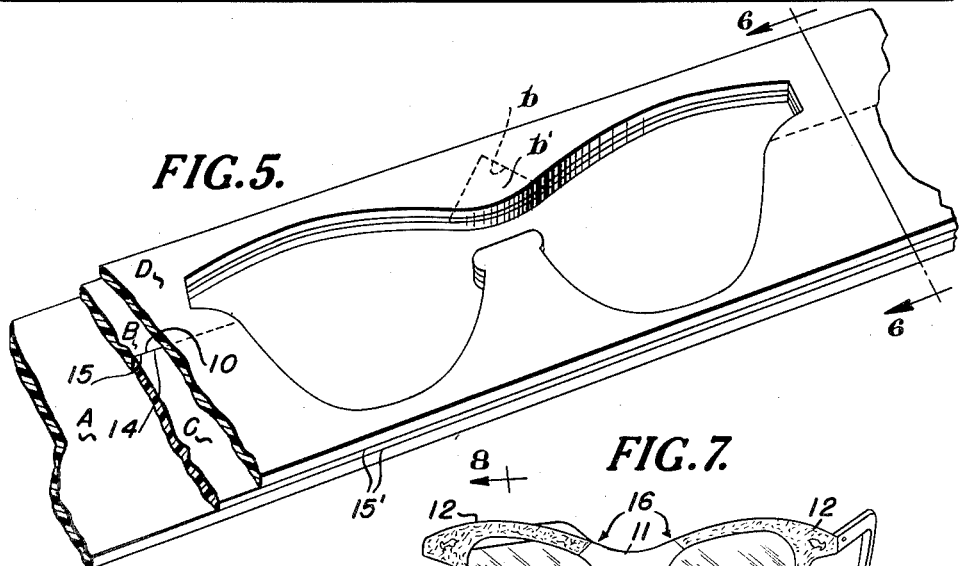
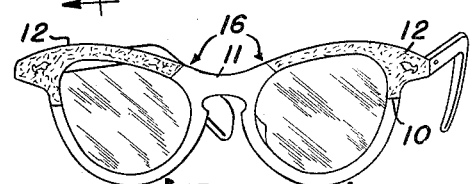
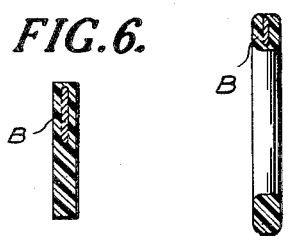
INVENTOR
*Herbert P. Collier, Jr.*
BY *Cushman, Darby & Cushman*
ATTORNEYS

Patented May 4, 1954

2,677,634

UNITED STATES PATENT OFFICE 2,677,634

METHOD OF MAKING SPECTACLE FRAMES

Herbert P. Collier, Jr., Prince George, Va., assignor to Titmus Optical Company, Inc., Petersburg, Va., a corporation of Virginia Application October 6, 1953, Serial No. 384,407

6 Claims. (Cl. 154—125)

The present invention relates to a method of producing spectacle frames from plastic material and, more particularly, spectacle frames in which the nose bridge is clear and the upper portions of the lens mounts are made to have the appearance of some desired color or design.

A particular object of this invention is to provide a method of producing spectacle frames of this character from layers of plastic material in which the layer of contrasting color or for imparting the desired design is disposed between two layers of clear plastic.

Another object of the invention is to provide a method in which the stock from which the spectacle frames are formed is built up as an integral structure by the use of suitable laminae of plastic material whereupon spectacle frames having a clear nose bridge and the upper portions of the lens mounts provided with the contrasting color or design may be readily stamped from such laminated stock.

A further object of the invention is to provide a method of building up the laminae whereby from a single standard stock material frames having a clear nose bridge of any desired size may be formed by stamping out the stock. That is, in accordance with the present invention the stock may be used to produce all of the usual ranges of sizes of spectacle frames without modifying the laminated structure from which the frames are stamped so that one stock material will accommodate any special size of lens mount or nose bridge.

The invention will be best understood by reference to the accompanying drawings, in which:

Figure 1 illustrates a top view of a layer of clear plastic which is in the form of a strip of any desired length or width;

Figure 2 is a top plan view of a strip of colored plastic which is of less width than the width of the layer of clear plastic shown in Figure 1;

Figure 3 is a top plan view of a strip of clear plastic also of less width than the strip shown in Figure 1, it being noted that the edge of Figure 2 along one edge is provided with spaced indentations which are preferably triangular, and the strip of Figure 3 being formed along the adjacent edge with spaced projections which are of the same shape and size as the indentations, so that the two may be interfitted to form a composite layer, the indentations and projections being preferably made by the same die;

Figure 4 is a top plan view similar to Figure 1;

Figure 5 is a perspective view partly broken away and showing the assembly of the layers of Figures 1 to 4 to produce the stock material of the present invention from which a spectacle frame has been stamped;

Figure 6 is a sectional view taken on the line 6—6 of Figure 5 before the spectacle frame of Figure 7 is stamped therefrom showing all lines of jointure obliterated by heat and pressure;

Figure 7 is a perspective view of a pair of spectacle frames produced from the laminated or built-up structure of Figures 5 and 6 by stamping out the same from the laminated stock and showing the clear nose bridge and the upper portions of the lens mounts of a contrasting color or design; and Figure 8 is a sectional view on the line 8—8 of Figure 7, the edges being suitably rounded and finished and also showing that all lines of jointure have lost their identity.

Referring to Figure 1, and for purposes of illustration, the reference numeral A represents a sheet of clear plastic which may be of any desired length and width and is of usual thickness. Referring to Figure 2, the reference numeral B represents a strip of colored plastic or plastic provided with a suitable design which is of less width than the width of the layer A of Figure 1. It is to be noted that the strip B along its lower edge 10 is provided with spaced indentations $b$ which may be of any desired size or shape, such that when the assembled stock shown in Figure 5 is stamped to produce the spectacle frame shown in Figure 6, the nose bridge 11 will present a clear appearance while the upper portions 12 of the lens mounts, indicated as a whole at 13, will present the contrasting appearance provided by the layer B. Preferably, the indentations $b$ are triangular, as shown, since I find this shape to be the most desirable from the standpoint of manufacture and appearance of the final spectacle frame. Referring to Figure 3, the layer of clear plastic C is of less width than the base layer A and along its top edge 14 is provided with projections $b'$ of substantially the same size and shape as the indentations $b$ in the layer B. The indentations $b$ and projections $b'$ are preferably made by the same die, so that they may be closely interfitted to form a composite layer B—C in which the line of jointure 15 between the two layers B and C loses its identity and cannot be discerned in the final product. The thickness of the layers B and C is the same but preferably less than the thickness of the base layer A, and it will be noted that the layer C provides a filler layer so that the final spectacle frames are of uniform thickness throughout. The layer D shown in Figure 4 is preferably the same as the layer A, as described above, and, therefore, need not be further described, being the other base layer.

The material of which the plastic layers A to D is formed may be of any well-known suitable plastic material of which numerous types are now used and are commercially available, and, hence, no invention is considered to reside in the selection of such plastic materials. Preferably, it should be of a character in which the laminae can be permanently united into an integral structure by heat and pressure so that none of the laminated joints is observable, and it is also desirable that the plastic be of such a character that it can be rendered tacky by means of a suitable solvent, so as to form a preliminary adhesively held structure to hold the layers in position for the final laminating operation under heat and pressure. If it is not desired to use a solvent, of course, a suitable adhesive may be used, which is compatible with the plastic material, as well-known.

The layers described in connection with Figures 1 to 4 are built up into the stock shown in Figure 5 preferably by coating the layer A with a suitable solvent to render it tacky and superposing upon it the strip B. Thereupon the strip C is superposed upon the base layer A with the projections $b'$ disposed in the indentations $b$ and the adjacent lower and top edges 19 and 14, respectively, of the strips in substantial abutment, as shown in Figure 5, so as to assure that, in the final product, the line of jointure between the layers B and C, will not be apparent. Referring to Figure 5, the composite layer B—C produced in this manner is illustrated as disposed upon the base layer A and between the layers A and D. Thereafter, the layers B—C or the clear layer D may be coated with a solvent and applied over the composite layer B—C so as to form a laminated structure in which the layers are adhesively united together to form the stock from which spectacle frames shown in Figure 7 may be stamped by means of a suitable stamping die after the final uniting of the layers under heat and pressure into an integral structure in which all of the lines of jointure between the layers are obliterated.

In the drawings I have, for purposes of illustration, shown in Figure 5 a length of stock sufficient to allow one pair of spectacle frames to be produced, but it is to be understood that the base layers, as stated above, may be of any desired length or width, so that the number of spectacle frames which may be produced from a single built-up unit may be indeterminate or according to the number of stamping dies available in a single machine. Preferably, the stock shown in Figure 5 is prepared as a strip which is passed continuously through the stamping machine and the spectacle frames shown in Figure 7 are successively stamped from this strip. As shown in Figures 2 and 3, the stock material will produce at least three pairs of spectacle frames, as indicated by the indentations $b$ and projections $b'$.

In actual production, a series of the strips of stock shown in Figure 5 may be formed on a single sheet, and thereafter the strips are severed from this sheet for feeding to the stamping machine.

An important consideration of this invention is the provision of the spaced indentations $b$ in the colored or design strip B and the complementary projections $b'$ formed in the clear strip C. As stated above, these indentations may be of any size or shape and are preferably triangular and, referring to Figure 5, it will be observed that by having the area of the indentation $b$ in the colored or design strip completely occupied by the interfitting clear projection $b'$ of the clear strip C, when the laminated stock of Figure 5 is stamped out, the nose bridge 11 will be produced from the clear plastic only of the layers A, C and D, including the projection $b'$. In this manner, regardless of the size of the spectacle frame, the indentation $b$ and corresponding projection $b'$ may be made of a size to comprehend all of the standard ranges of sizes of nose bridges or spectacles, and it is not necessary to resort to any special operations to assure a clear nose bridge for a particular size or design of spectacle frame. In other words, the layer C and the projection $b'$ thereon comprehend the area of the stock from which the nose bridge portion will be stamped, and this area will be clear in contrast to the appearance of the top portions of the lens mounts which will be colored or present a particular design by reason of the presence of the layer B disposed between the clear layers A and D. As stated, the presence of the indentations and interfitting projections allows for considerable tolerance in size and design of the spectacle frames, and the respective nose bridges which may be required, which is of considerable importance in that it eliminates the necessity of providing a special stock for each particular size of spectacle frame or nose bridge.

While I have described the layers A, C and D as being of clear plastic, it is to be understood that such layers may be of a contrasting color or design from the intermediate layer B, the important consideration being that the top portions of the lens mounts present a contrasting appearance to the appearance of the nose bridge portion so that many modifications and changes may be made, as regards the color and design of the respective layers to prevent a contrasting appearance between the bridge and the top of the lens mounts.

Referring to Figure 5, the stock strip illustrated therein and which I have indicated has been adhesively united together either by means of a suitable compatible adhesive for the plastic layers or by means of a solvent which will render the layers tacky and adhesive to one another, is formed into an integral structure in which the line of jointure 15 between the layers B and C of the composite layer loses its identity and the lines of jointure 15' along the longitudinal edges of the stock, as shown in Figure 5, also lose their identity by subjecting the stock to heat and pressure in the well-known manner to form an integral construction from which the spectacle frames may be readily stamped, as above-described, and shown in Figures 6 and 8.

Referring to Figure 5, it will be noted that the thickness of the layers B and C is substantially identical so that the stock shown in Figure 5 has a uniform thickness throughout, as shown in Figure 6. Also, and referring to Figure 8, it will be noted that in the final product, the spectacle frames, likewise, are of uniform thickness.

As indicated above, it is preferred to make the indentations $b$ and interfitting projections $b'$ of substantially identical shape and size, and to make them triangular since, in doing so, when the spectacle frames are stamped from the stock of Figure 5, the inner boundary of the contrasting appearance of the tops of the spectacle frames, as indicated at 16, will present an angular appearance, which is particularly pleasing in spectacle frames. As explained above, the size of the nose bridge of clear or contrasting color from that of the tops of the lens mounts, may be varied in accordance with the requirements of the size and design of spectacle frame without having to change the area of the indentations b and projections b' which, as indicated, is of particular value in that the wide range of spectacle frames may be accommodated by the method of this invention without requiring a specific operation and design of indentation and projection for each particular size and design.

Referring to Figure 5, the stock is preferably used in the manner described above to produce a spectacle frame in which the nose bridge is either clear and top portions of the lens mounts present a contrasting color or design, or the nose bridge presents a color or design and the top portions of the lens mounts present a clear appearance, or the nose bridge may present one color or design or appearance and the top portions of the lens mounts may present a different appearance or design or color, or vice versa. On the other hand, if it is desired to have the nose bridge and the top portion of the lens mounts continuously present the identical appearance, color or design, the strip material shown in Figure 5 is punched out with the dies reversed or the stock material reversed, so that the appearance, design or color of the intermediate layer B is continuously presented on both the bridge and the top portions of the lens mounts.

The plastic material of which the layers A to D is formed may be selected from cellulose nitrate, cellulose acetate and cellulose butyrate, as customary in the industry. The invention is of particular value for making spectacle frames, and, for this purpose, the base layers A and D are of clear plastic while the juxtaposed layers B and C of the composite intermediate layer have the layer B of a contrasting color or provided with a design and the filler layer C of clear plastic. In this manner there is produced a spectacle frame in which the nose bridge is formed of the clear plastic and the top portions of the lens mounts present the contrasting appearance of the layer B, which is sandwiched between the base layers A and D when the spectacle frame is viewed from either side.

Referring to Figures 6 and 8, it will be noted that the layer B of colored plastic or containing a suitable design is completely sealed within the laminated structure shown in Figures 5 and 7 by the base layers A and D when the laminated structure is subjected to heat and pressure and, therefore, the colored appearance or design does not interfere with the character of the spectacle frames and is thoroughly protected against deterioration at all times.

I claim:

1. The method of making a decorative spectacle frame of plastic material comprising superposing in juxtaposed relation on a base layer of plastic, layers of plastic of substantially equal thickness and of contrasting appearance, one of said juxtaposed layers having an indentation therein extending inwardly from its lower edge and the other of said layers having a projection of substantially identical size and shape as said indentation extending outwardly from its upper edge, interfitting the projection and indentation of the respective juxtaposed layers with the corresponding longitudinal edges of these layers in substantial abutment to form on said base layer a composite continuous layer of substantially uniform thickness, superposing on said composite layer, a layer of contrasting appearing plastic to one of said juxtaposed layers, joining said layers into an integral structure, and stamping out a spectacle frame from said integral structure, said indentation and projection being so constructed and arranged that when a spectacle frame is stamped from said integral structure, nose bridge and lens mount sections are produced of respectively contrasting appearance and the bridge comprises the material of said projection.

2. The method according to claim 1 in which the layers are joined into an integral structure by heat and pressure.

3. The method according to claim 1 in which the layers are adhesively joined together.

4. The method according to claim 1 in which the layers are adhesively joined together by means of a solvent which renders the plastic tacky.

5. The method according to claim 1 in which the layers are adhesively joined and thereafter the layers are joined into an integral structure by heat and pressure.

6. The method according to claim 1 wherein said layer containing said indentation is of colored plastic and the remaining layers are of clear plastic whereby the nose bridge is clear and the lens mount sections are of the contrasting appearance created by said colored plastic.

References Cited in the file of this patent

UNITED STATES PATENTS

| Number | Name | Date |
| --- | --- | --- |
| 235,799 | Naylor | Dec. 21, 1880 |
| 602,159 | Harrison | Apr. 12, 1898 |
| 1,332,349 | Malcom | Mar. 2, 1920 |
| 1,968,328 | Stuparich | July 31, 1934 |
| 2,609,278 | Eyles | Sept. 2, 1952 |

FOREIGN PATENTS

| Number | Country | Date |
| --- | --- | --- |
| 466,034 | Great Britain | May 20, 1937 |
| 500,708 | Great Britain | Feb. 14, 1939 |
| 617,084 | Great Britain | Feb. 1, 1949 |
| 266,411 | Switzerland | Apr. 17, 1950 |
| 984,689 | France | Feb. 28, 1951 |

OTHER REFERENCES

Acrylics for Patterned Laminates, in Plastics Magazine, September 1947, page 21.